No. 838,285. PATENTED DEC. 11, 1906.
W. J. TOLLE.
WIRE FENCE STRETCHER.
APPLICATION FILED APR. 11, 1906.
2 SHEETS—SHEET 2.
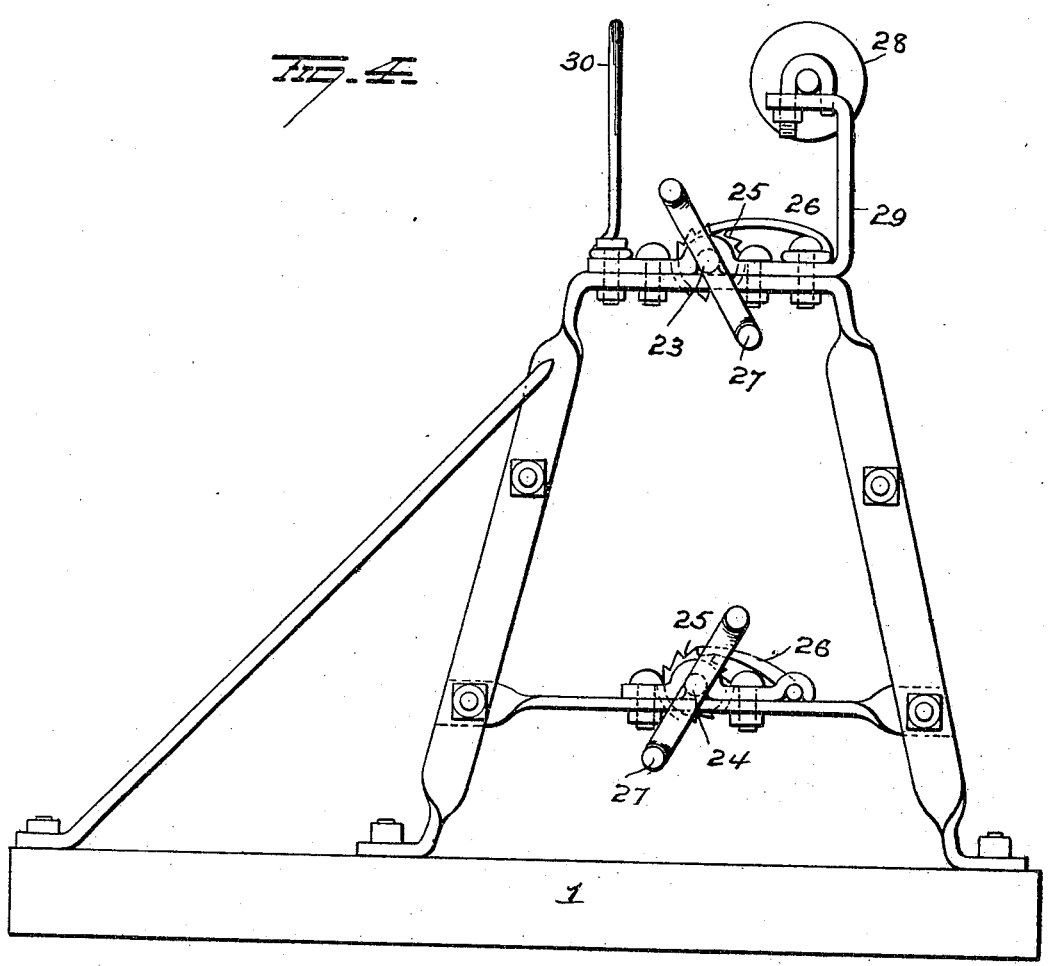

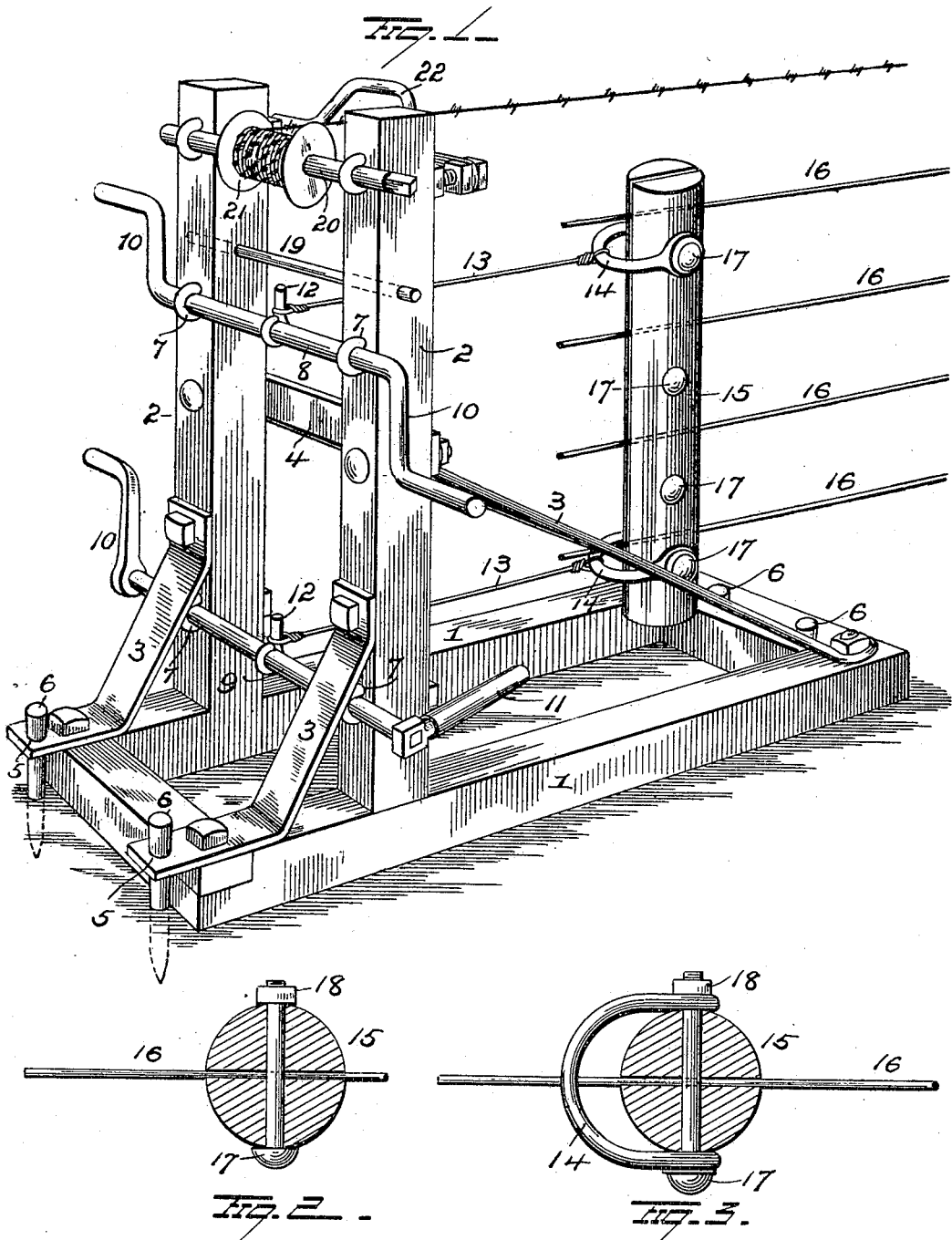

UNITED STATES PATENT OFFICE.

WILLIAM J. TOLLE, OF REESVILLE, OHIO.

WIRE-FENCE STRETCHER.

No. 838,285.   Specification of Letters Patent.   Patented Dec. 11, 1906.

Application filed April 11, 1906. Serial No. 311,142.

*To all whom it may concern:*

Be it known that I, WILLIAM J. TOLLE, a resident of Reesville, in the county of Clinton and State of Ohio, have invented certain new and useful Improvements in Wire-Fence Stretchers; and I do hereby declare the following to be a full, clear, and exact description of the invention, such as will enable others skilled in the art to which it appertains to make and use the same.

My invention relates to improvements in wire-fence stretchers, the object of the invention being to provide improved mechanism for simultaneously stretching all the wires of a fence; and the invention consists in certain novel features of construction and combinations and arrangements of parts, as will be more fully hereinafter described, and pointed out in the claims.

In the accompanying drawings, Figure 1 is a perspective view illustrating my improvements. Figs. 2 and 3 are views of details of construction, and Fig. 4 is a view of a modification.

1 represents a rectangular frame or base, provided with uprights or standards 2, strengthened by braces 3 and cross-bar 4. The front cross-bar of base 1 and rear brace-bars, which extend out beyond the frame, are made with openings 5 to receive pins or spikes 6, to be driven in the ground and firmly anchor the device.

Supported in bearings 7 at different elevations on uprights or standards 2 are horizontal shafts 8 and 9, respectively, which are preferably provided with crank-arms 10, and one end of the lower shaft may be made angular to receive an angular opening in the end of a lever 11. Both of these shafts are provided with fingers 12 to receive the looped ends of wires 13 and wind the latter on the shafts when the shafts are turned, and these wires 13 are attached to yokes 14, pivotally secured to a clamping-post 15. This clamping-post 15 is split longitudinally to receive all the fence-wires 16 and is provided with bolts 17 and nuts 18 to securely clamp all wires in the post, and when the shafts 8 and 9 are turned to wind wires 13 thereon the clamping-post will be drawn toward the uprights or standards 2 and all the fence-wires will be tightened simultaneously and may be held in this position while being secured to the fence-posts.

The shafts 8 and 9 may be locked against turning by means of sliding rods 19, which latter can be slid out into the path of cranks 10 and prevent the shafts releasing the fence-wires until tightened, or any other suitable mechanism may be provided to lock the shafts.

At the upper end of uprights or standards 2, a shaft 20 is located and has a spool or reel 21 fixed thereon. This spool or reel 21 carries a supply of barb wire to top the fence, and the wire is guided to position by a wire bracket-guide 22, secured to the uprights by bolts and nuts, as shown. The barb-wire is drawn off the spool the length desired, and when the crank or lever is brought into use to turn the shaft the barb-wire can be tightened by turning the shaft 20 to tend to wind the wire thereon, and held while being secured to the fence-posts.

In the modification illustrated in Fig. 4 the supporting framework or standards are formed of metal bars bent into the shape shown and securely bolted together and have horizontal supports for the shafts 23 and 24, having ratchet-wheels 25 and dogs 26 locking the shafts in any and all adjustments.

The ends of the shafts are provided with yokes or forks 27 to receive a lever to turn the shafts, and the barb-wire-supply spool or reel 28 is mounted on a shaft supported in brackets 29 at the top of the standards, and the wire is guided into position on the fence by the wire-guide 30.

A great many slight changes might be made in the general form and arrangement of the parts described without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. In a fence-stretcher, the combination with an upright frame, a plurality of shafts mounted thereon one above another, and means for turning said shafts independently, of a single fence-wire clamp constructed to receive a plurality of superposed fence-wires, and flexible devices connected with said clamp near its respective ends and adapted to wind on the respective shafts.

2. A fence-stretcher comprising a base, uprights or standards thereon, shafts mounted on the uprights or standards, a clamp comprising a split post to receive a series of superimposed fence-wires, bolts passed through the split clamping-post, nuts on said bolts to clamp the wires in the post, yokes secured to the clamping-post near the respective ends thereof and flexible connecting devices secured to the yokes and adapted to be wound on the respective shafts.

3. A fence-stretcher, comprising a base, uprights or standards thereon, shafts on the uprights or standards, cranks on the shafts, means for securing the shafts against turning, a fence-wire clamp, flexible devices connecting the clamp with the shafts, a spool or reel at the upper end of the uprights or standards for barb-wire, means for turning the spool or reel, and a wire guide-bracket to guide the barb-wire from the spool or reel to the fence.

4. In a fence-stretcher, the combination with a base and standards or uprights thereon, of pins or spikes to enter openings in the base and be driven into the ground to anchor the base, a shaft on the standards or uprights, means to turn the shafts, a fence-wire clamp, and fingers on the shaft to receive the looped ends of the wires and wind the wires on the shafts when the latter are turned.

In testimony whereof I have signed this specification in the presence of two subscribing witnesses.

WILLIAM J. TOLLE.

Witnesses:
A. A. GEORGE,
WM. J. DUDLEY.